March 15, 1927.  1,620,760

F. A. HAYES

VARIABLE SPEED POWER TRANSMISSION MECHANISM

Original Filed April 3, 1922  4 Sheets-Sheet 4

Inventor
F. A. Hayes
By his Attorneys
Cooper, Kerr & Dunham

Patented Mar. 15, 1927.

1,620,760

UNITED STATES PATENT OFFICE.

FRANK A. HAYES, OF NEW YORK, N. Y.

VARIABLE-SPEED POWER-TRANSMISSION MECHANISM.

Application filed April 3, 1922, Serial No. 548,948. Renewed June 15, 1925.

This invention relates to variable-speed power-transmission mechanisms in which the various "speed" changes are produced by shifting gears of different diameters out of and into mesh. In such transmissions one or both of the gears which are to be meshed are usually in motion at different pitch-line velocities, with the result that the shift is often accompanied by objectionable grinding noise and by sudden shocks which are liable to cause serious injury to the gears. On the other hand if the gears are running at the same or very nearly the same pitch-line velocity they can be slid into engagement easily and noiselessly, without shock. It is accordingly the chief object of my present invention to provide a mechanism, preferably of the sliding gear type, in which the shiftable gear or gears are positively locked until the increasing velocity of one or the decreasing velocity of the other, or both these factors, have brought the gear tooth velocities to the desired ratio, which ratio is, as stated above, preferably unity. When this point is reached the lock is automatically released and the gears are therefore allowed to slide smoothly and quietly into mesh. Another object is to provide for automobile use a mechanism which has the novel characteristics mentioned but which does not otherwise depart materially from the conventional type of transmission. To these and other ends the invention resides in the novel features and combinations hereinafter described.

In its preferred embodiment the invention is characterized by a device or mechanism conveniently termed a "synchronizer", in that it affords a connection between the gears which by driving or retarding one of them brings their velocity ratio to approximately unity and at that instant releases the slidable gear so that it can be shifted into mesh with the other, the relatively slight force needed for the actual shifting of the gear being provided by the hand or foot of the operator, or by a tensioned spring, compressed air, a magnetic device, or other suitable source of power. It is believed that the invention will find its most important application in the automotive field and I have therefore illustrated it herein as embodied in an automobile transmission of the selective sliding gear type, but it will be understood that it may be used for other purposes.

Referring now to the accompanying drawings, in which the preferred form of the invention is illustrated—

Fig. 3ª is a diagrammatic end view of the synchronizing mechanism, from the rear.

Figures 1, 9:
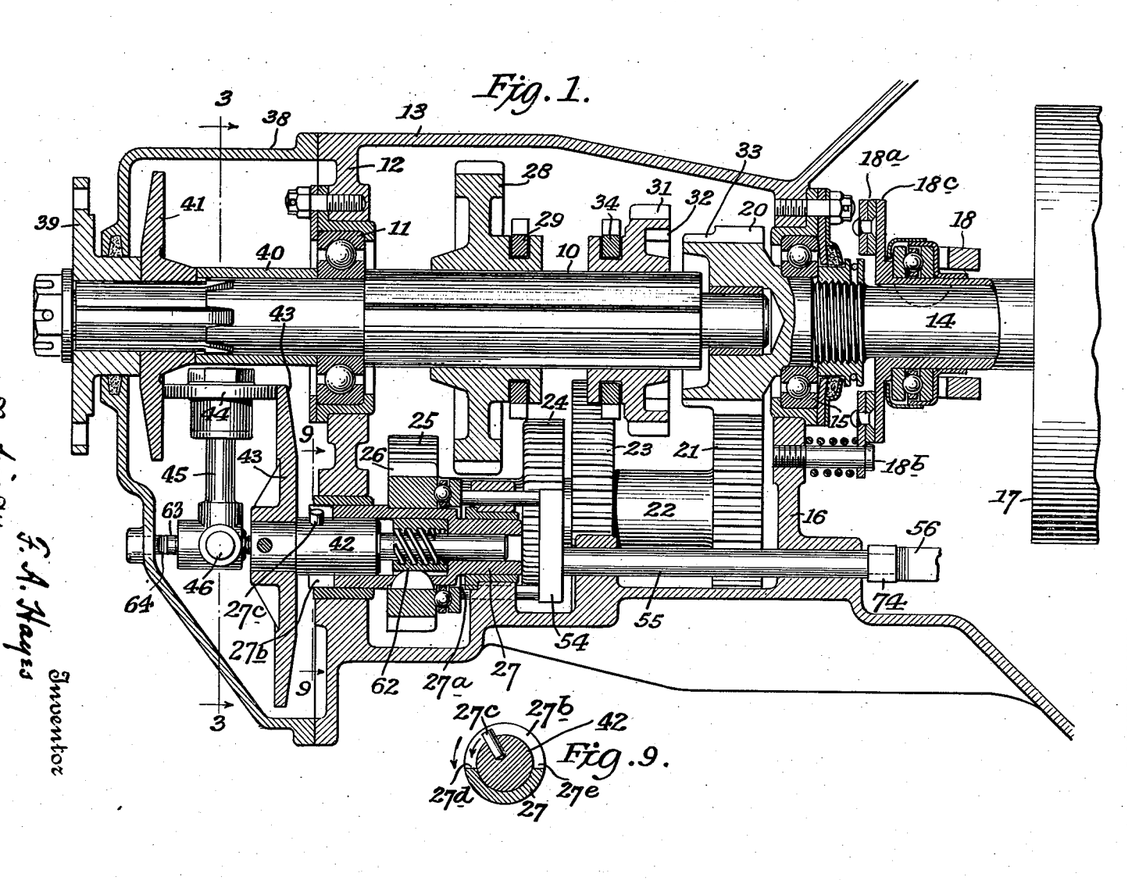
Fig. 1 is a sectional plan view on a horizontal plane through the axis of the main or driven shaft.
Fig. 9 is a detail section on line 9—9 of Fig. 1, looking in the direction of the arrows.
Figure 8:
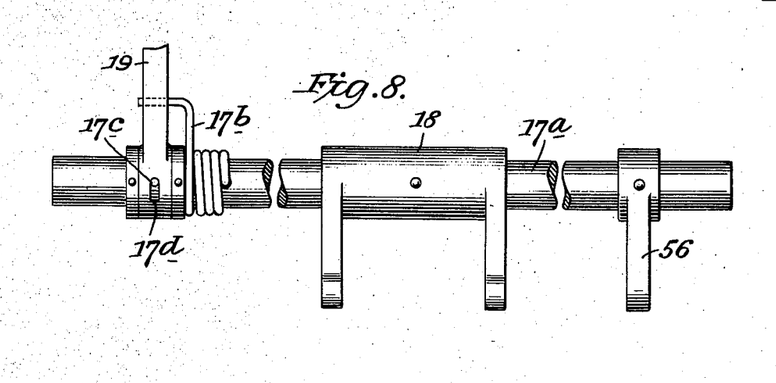
Fig. 8 is a detail rear view of the clutch pedal shaft and parts mounted thereon.

The splined main or driven shaft 10, Fig. 1, is mounted in a bearing 11 in the transverse rear wall 12 of the casing 13 and at its front end the shaft is journaled in the driving shaft 14 mounted in bearing 15 in the front wall 16 and driven by the engine (not shown) through a suitable friction clutch indicated diagrammatically at 17. The clutch, which is normally held engaged by suitable spring-mechanism, not shown, may be disengaged by a clutch-release fork 18 actuated by a pedal 19, Fig. 2, through the medium of any convenient and suitable connection, as for example that shown in Fig. 8, in which the fork is pinned to the shaft 17ª on which the pedal is yieldingly mounted by means of a spring 17ᵇ. A pin 17ᶜ, extending into the shaft through a slot 17ᵈ in the eye of the pedal determines the normal position of the fork and pedal relative to each other but permits a slight rocking movement of either independently of the other for the purpose hereinafter explained. On the rear end of the driving shaft 14 is a gear 20, Fig. 1, in constant mesh with a gear 21 on the jack-shaft or countershaft 22 which also carries the fixed or non-sliding "intermediate" gear 23, the non-sliding "low" gear 24, and the reverse gear 25, the latter being in constant engagement with the reverse idler gear 26 on the reverse idler shaft 27 in a plane above the jack-shaft 22. The sliding low and reverse gear 28, on the splined driven shaft 10, may be shifted rearwardly into mesh with reverse idler 26 or forwardly into mesh with fixed low gear 24, by means of a fork 29 fixed on the sliding shifter rod 30, Figs. 2, 3 and 4, and the sliding intermediate and high gear 31 can be shifted rearwardly into mesh with the fixed intermediate gear 23, and forwardly to bring the clutch member 32 on the front face of the gear into engagement with the clutch member 33 on the rear face of gear 20 (thus giving "high" speed or direct drive) by means of a fork 34 fixed on the sliding shifter rod 35, Figs. 3, 5 and 6. These rods are yieldingly locked by means of plungers 30$^a$, 35$^a$, having chisel pointed upper ends cooperating with corresponding notches in the rods, the plungers being held in upper position by a spring-actuated member 35$^b$ having a head 35$^c$ underlying the heads on the plungers, as is clearly shown in Fig. 3. Rotation of plunger 35$^a$ and member 35$^b$ is prevented by having the head 35$^c$ embrace the flattened lower end of the plunger, as in Fig. 5, while rotation of plunger 30$^a$ is prevented by the scarf-joint fitting of its head 30$^b$ with head 35$^c$. It will be noted (in Fig. 5) that at its rear end the underside of shifter rod 35 is flattened so that it may be shifted forwardly (to go into "high" speed) without depressing plunger 35$^a$. Either fork may be picked up by the usual hand lever 36, Fig. 2, mounted in the ball and socket bearing 37 so as to be capable of swinging forwardly and rearwardly, and leftwardly and rightwardly. The construction described gives the customary "three speeds forward and reverse", as will be readily understood. It will be observed (Fig. 1) that the jack-shaft 22 is at the right of and below the main shaft 10 and that the latter and the reverse idler shaft 27 are in the same horizontal plane.

A clutch-brake, actuated by the release fork 18, is provided, comprising a spring-actuated friction-ring 18$^a$, Fig. 1, mounted on a plurality of studs one of which is shown at 18$^b$, and a friction plate 18$^c$ slidable on but rotating with the shaft 14. When the clutch is disengaged, further downward movement of the pedal presses the plate 18$^c$ against the spring ring 18$^a$, thereby braking the shaft 14 and slowing up the countershaft 22 and its gears, including the reverse idler gear 26 and synchronizing disk 43, as soon as either sliding gear (28 or 31) is shifted into neutral.

On the rear end of the main or driven shaft 10, outside of the rear housing 38, is a driving flange 39, Fig. 1, for connection (through a suitable universal joint, not shown) to the propeller shaft by which the driving torque is transmitted to the rear wheels of the car.

Splined on the main shaft 10, Fig. 1, between the spacing sleeve 40 and the hub of the driving flange 39, is a friction disk 41, and pinned on the end of the shaft 42 is a similar disk 43. The shaft 42 is arranged inside of the hollow reverse idler shaft and is connected therewith (by means described hereinafter) so that the two will in general rotate together as a unit but may have a slight rotary and relative axial movement independently of each other. The two disks 41 and 43 overlap each other, as indicated, and between the two is a synchronizing wheel or synchronizer 44 rotatable and freely slidable on an arm or shaft 45 parallel to the disks and extending at right angles to their axes from a vertical rod 46, Fig. 3, capable of limited vertical movement in upper and lower socket pieces 47, 48. The upper socket piece 47 is threaded in place so that it may be adjusted to determine the upper position of the rod, which has a shoulder 46$^a$ adapted to engage the lower edge of the socket piece. A coil spring 49 around the rod above the arm 45 urges the two downwardly. The synchronizer 44 is not mounted directly on the arm 45 but on a carrier 50, slidable on the arm and having an upwardly extending finger or detent 51 (see also Fig. 5) which is notched to embrace the heads 30$^b$ and 35$^c$ on the bolts or plungers 30$^a$, 35$^b$.

Referring now to Fig. 3$^a$, which is a diagrammatic rear elevation of the synchronizing mechanism: It is assumed that the transmission mechanism is in neutral, the car in motion, and the clutch disengaged. Under these conditions disk 41 is being rotated in the direction of the arrow by the motion of the car, and disk 43 is either motionless (having been brought to rest by the clutch brake) or is rotating slowly in the counter-clockwise direction against the resistance of the clutch brake. Assuming, further, that the synchronizer 44 is above the plane of the disks' axes (represented by the line 10—29), it will be seen that the disk 41 will by frictional engagement rotate the synchronizer wheel 44 and will impart to it a tendency to move leftwardly in the general direction of the arrow $a$. The wheel 44 will in turn rotate the disk 43 (and countershaft 22) counterclockwise. At the same time, disk 43 offers more or less resistance to the driving effort of the wheel, thus causing the latter to roll up or climb the disk, and also urges the wheel in a general leftward direction. The net result is that the wheel itself will, if free, move upwardly and leftwardly. On the other hand, if the wheel is below the plane 10—29 it will, in rotating the disk 43, move upwardly and rightwardly. These effects are utilized in the present embodiment of the invention (1) to lock the shifting mechanism, particularly the rods 30 and 35; (2) to bring the pitch-line velocity of the non-sliding transmission gear up to approximately unity ratio to the pitch-line velocity of the sliding gear; and (3) to unlock shifter rod 30 or 35 when the desired unity ratio is reached.

Referring again to Fig. 3ª, assume that the car is in motion with the clutch disengaged, as before, but that any two transmission gears are in mesh. In these circumstances the disk 43 is driven (counterclockwise) by the meshed gears at an angular speed which depends upon the gear-ratio or ratios involved. Suppose that the wheel is in the lower position shown in the figure, or anywhere below the axial plane 10—29. Disk 41 then exerts an upward and rightward impulse on the wheel and disk 43 exerts a downward and rightward impulse. Hence the wheel, if free, will move toward the right. Whether it will at the same time move up or down depends upon the surface velocities of the disks at their points of contact with the wheel. The surface velocity in each case depends upon the angular velocity of the disk and the distance of the point of contact from the axis of the disk. Assume, for example, that the two disks are rotating at the same angular speed and that the wheel is nearer axis 29 than axis 10. Evidently it will move upwardly and rightwardly, and, crossing the axial plane, will move leftwardly and upwardly until it is nearer axis 10 than 29, whereupon it moves downwardly until it again crosses the axial plane. Then it moves rightwardly until again nearer axis 29 than 10, whereupon it moves upwardly, and so on. Thus the wheel is caused to move in a path which is a closed curve symmetrical (in general) with respect to the axial plane. If disk 41 has a higher angular speed than 43, the path of the wheel will be nearer axis 10, and vice versa. In any case the radius or radius vector of the path is small in the present design, since its total vertical movement is limited to the vertical play of the T-piece 45—46, which can rise or fall only a fraction of an inch.

Figures 2, 6:
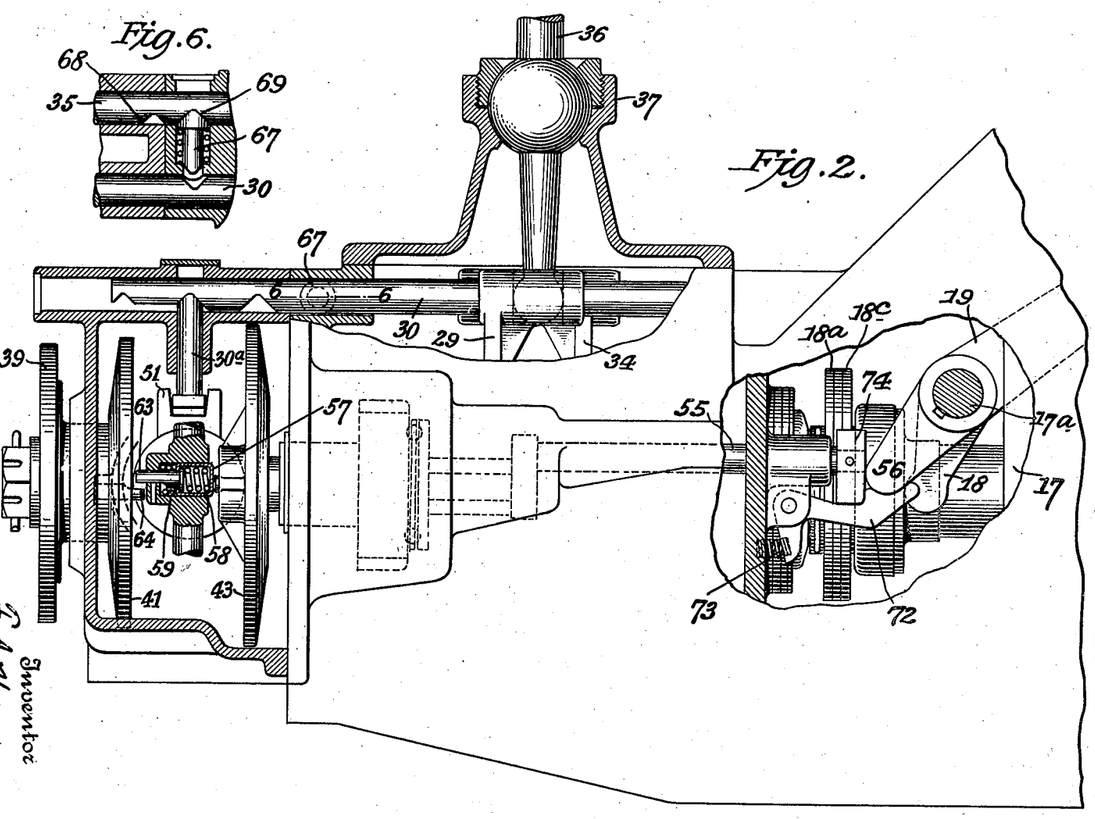
Fig. 2 is a side view with the external casing or housing partly in section to show the synchronizing mechanism, part of the latter being also in section.
Fig. 6 is a detail sectional plan view on line 6—6 of Fig. 2.

As prevously stated, the shaft or stud 42 on which the disk 43 is mounted, is fitted inside of the reverse idler shaft 27. The latter has a limited sliding movement and is connected to a yoke 54 and rod 55 extending forwardly into cooperation with a toe 56 on or connected with the clutch pedal 19 so that when the latter is depressed the shaft 27 (and the inner shaft 42) will be retracted, thereby carrying disk 43 into engagement with the wheel. This movement of the shafts brings the rear end against the plunger 57 in the T-piece 46, thereby compressing springs 58 and 59, as indicated in Fig. 2. Then when the pedal is released, the tension of these springs returns the shafts to their forward position, with the disk 43 out of contact with the synchronizer. Disengagement of the disk 43, as described, allows spring 49, Fig. 3, to depress the T-piece 46, thereby bringing the notched toe 60 of the detent 51 down upon the supporting bar 61. See also Fig. 5. At the same time the cam action of the notch swings the arm 45 slightly forward and thus carries the synchronizer wheel out of contact with the disk 41. The synchronizer is therefore in operation only when the clutch is disengaged, thereby preventing possible noise and eliminating unnecessary wear. The bar 61 is provided with suitable notches into which the toe 60 can seat itself and thus prevent the synchronizer from sliding back and forth when the car is in motion.

The two shafts 27 and 42 are connected internally by means of nut 62 threaded on the latter shaft and keyed to the former. Then if the clutch brake (18ª, 18ᶜ, Fig. 1) reduces the speed of the jackshaft too much, the synchronizer drives the disk 43 ahead of shaft 27, which action tends to screw the shaft 42 rearwardly out of the nut and increase the pressure on the wheel. But the shaft can have but little if any rearward movement, since the disk 43 is already bearing against the wheel 44. Hence the reverse idler shaft 27 must move forwardly, which movement throws the clutch pedal up slightly and thereby eases the clutch brake; or, if the operator is pressing the clutch pedal down too firmly the spring 17ᵇ (Fig. 8) will permit the shaft 17ª to rock independently of the pedal, with the same result. The jackshaft is then free to be driven by the disk 43.

When the plunger 57 is pushed back by the clutch pedal, as above described, the finger or stop 63 on the rear of the plunger is projected against a stop 64 extending forwardly from the rear wall of the housing. Then when the synchronizer rises the finger snaps over the stop and thereafter holds the synchronizer up far enough to make it necessary to synchronize the gears before they can be meshed, as will be more fully explained hereinafter.

Assume, now, that the car is standing, with the clutch engaged, the transmission in neutral and the engine running. Under these conditions the disks 41, 43 are separated, and the synchronizer 44, out of contact with both, is resting in its lower position, on bar 61. Desiring to start the car the operator depresses the clutch pedal, which throws out the clutch and applies the clutch brake, which in turn arrests the jackshaft and disk 43. At the same time the disk 43 is brought against the synchronizer wheel 44 and the latter is carried back against disk 41; but since neither disk is rotating, the synchronizer remains stationary in its lowermost position, and accordingly the detent or arm 51 is far enough below the heads 35$^c$ and 30$^b$ to permit either to be fully depressed by the cam action of the notches in the shifter rods. Hence when the car is at rest the operator can shift into any forward speed or into reverse.

Now assume that the operator has shifted into "low" and has released the clutch pedal, thus advancing disk 43 out of contact with the synchronizer and also, by engaging the clutch, causing the car to start. A car-speed suitable for shifting into a higher gear having been attained, he depresses the clutch pedal, which applies the clutch brake and brings the synchronizing mechanism into operation. Wheel 44 is thus set in rotation and immediately rises until the shoulder 46$^a$ on T-piece 46 strikes the bottom of socket piece 47. The axis of the disks and hence the wheel moves leftwardly, until it passes the "low" position, then moves downwardly and rightwardly. If the wheel takes its extreme rightward position the detent 51 is then under the notch or recess 30$^c$ in tappet 30$^b$, and accordingly the latter can be depressed far enough to permit shifting into neutral. But assume that the wheel takes a position in which the detent 51 is at the left of the notch 30$^c$. Now when the operator presses the shift lever toward neutral the first effect of the pressure, transmitted through the shifter rod 30 to the tappet 30$^a$ is to depress the latter and with it the spring-plunger 35$^b$ and synchronizer wheel 44 until the latch or finger 63 meets the stop 64. This movement of the rod is not sufficient to unmesh the gears; but the downward movement of the synchronizer wheel brings it below the axial plane of the disks, whereupon the wheel moves toward the right and brings the detent 51 under the notch 30$^c$ in tappet 30$^b$. The latter can now be depressed farther, and hence the pressure which the operator has been exerting on the shift lever slides the "low" gears out of mesh and into neutral. The wheel now begins to drive disk 43, rises promptly to its upper plane of motion, and travels leftwardly, driving the disk 43 (and with it the jackshaft and the clutch member 33) at decreasing speed, until the detent 51 reaches the lip 35$^d$ on tappet 35$^c$. The disk 43 is now rotating at its lowest speed relatively to disk 41; and evidently the ratio of speed of the jackshaft to the speed of the main shaft 10 depends upon the location of the lip 35$^d$. Accordingly the lip is so located that when the synchronizer is bearing against it the disk 43 will be rotated at a speed which gives unity or approximately unity ratio between the speeds of clutch members 32, 33. Hence the operator can shift directly into "high". But that shift may be undesirable. If so, he simply throws the control lever 36 into the second or "intermediate" notch and presses firmly. The first effect of this pressure is to advance the shifter rod 35, which (Fig. 5) came down the plungers 35$^a$ and 35$^b$ (Fig. 3), and with them the synchronizer 44 until further downward movement is prevented by the finger 63 meeting the stop 64. The movement of the rod is not far enough to mesh the gears but it is far enough to bring the axis of the synchronizer wheel below the axial plane of the disks, whereupon (Fig. 3) and the wheel moves toward the right (Fig. 3) and drives the disk 43 at increasing speed, reaching a position at which the speed of the driven disk (relative to the speed of the driving disk 41) is such as to give the fixed intermediate gear 23, Fig. 1, a pitch-line velocity-ratio of unity, or approximately unity, with respect to sliding gear 31. At this instant the rightwardly moving detent 51 passes the right end of the tappet head 35$^c$, thus unlocking the same, whereupon the pressure which the operator has maintained on the shift lever slides gear 31 smoothly and silently into mesh with gear 23. Upon release of the clutch pedal the clutch is engaged and the engine takes the load. At the same time the synchronizer is released and falls to rest on the bar 61. From what has already been said, it will be seen that the shift from second into third or "high" speed can be made with equal ease since when the clutch is disengaged and all the gears are in neutral the synchronizer at once takes the "high" position and maintains clutch members 32 and 33 at proper speed as long as the shift lever is not pressed into second, first, or reverse notch. Hence pressure in the "high" or third-speed notch at once engages the clutch 32—33.

Suppose that the car is moving in "high" speed and the operator desires to shift down into second. Depressing the clutch pedal and shifting into neutral, the synchronizer 44 at once takes the high-speed position (Fig. 3), whereupon pressure of the shift lever in the second-speed notch causes the synchronizer to move toward the right, driving disk 43 and jackshaft 22 at increasing speed until the synchronizer passes the head 35$^c$, at which point the gear 23 has the proper pitch-line velocity, whereupon the continued pressure on the shift lever slides gear 31 into mesh without noise or shock. To shift from second into first or from "high" into first the operation is the same, except that the shift lever is pressed into the "low" speed notch. In that case the synchronizer must not only pass the head 35$^c$ but must also travel far enough to reach the rabbet or recess 30° in head 30ᵇ before the gear 28 can be slid into mesh with gear 24. This notch is so located, however, that when the synchronizer reaches it the gear 24 has the pitch-line velocity necessary for smooth and silent engagement with the other gear.

Figure 3:
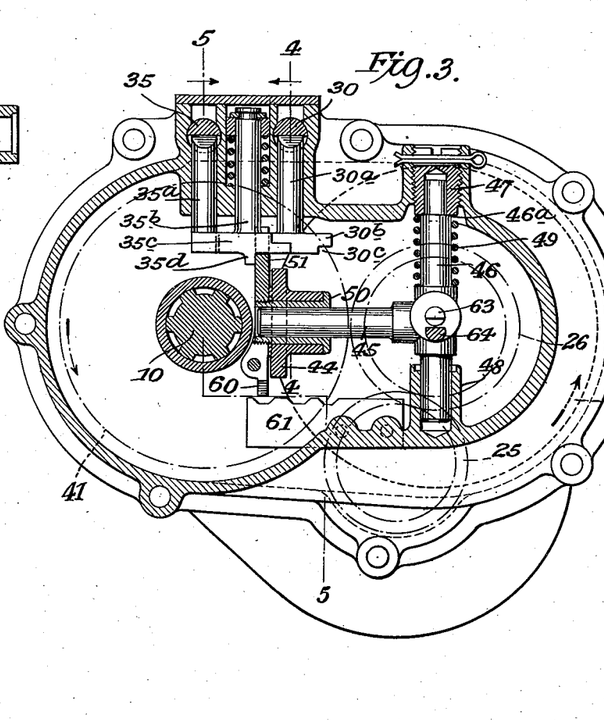
Fig. 3 is a cross section on line 3—3 of Fig. 1.
Figure 4:
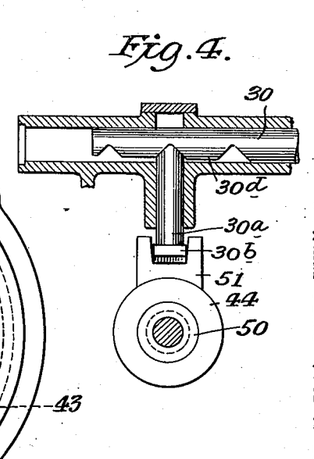
Figs. 4 and 5 are detail sections on lines 4—4 and 5—5 of Fig. 3, looking in the directions of the arrows.

To shift into reverse, the shifter rod 30 must move toward the rear, that is, toward the right in Fig. 4. From this figure it will be noted that the hump 30ᵈ is lower than the rear hump, and hence shifting into reverse requires greater depression of tappet or bolt 30ᵃ than does shifting into low. But the recess 30° is too shallow to permit this extra depression, and the length of the carrier 50 (Fig. 3) is such as to prevent the synchronizer from moving entirely past the head 30ᵇ. Consequently the shift into reverse can be made only when the synchronizer is in its lowest position and cannot be made when it is in its upper position,—which upper position it always occupies when the car is in motion with the clutch disengaged and the gears all in neutral. This means that the car must be at rest since it is only then that the synchronizer remains on the bar 61 when the clutch is disengaged.

From the foregoing it will be seen that to change "speed" the operator simply releases the clutch, shifts into neutral, and presses the shift-lever into the desired speed-notch, whereupon the selected sliding gear slips into mesh with the other gear as soon as (but not until) the latter is "synchronized" with the first. A little reflection will make it clear that any other result is impossible. For example, suppose the operator wants to shift down into second speed but before the synchronizer passes the tappet 35° he relaxes the pressure on the shift lever and goes back into neutral: immediately the synchronizer rises and moves back to the "high" position, thereby reducing the speed of the jackshaft and gears driven by it. On the other hand, suppose that as or after the synchronizer passes the tappet 35° he holds the shift lever; or relaxes the pressure on the lever, without, however, throwing the lever back into neutral. At this time the detent 51 is under tappet 30ᵇ, which has not been depressed by the movement of shifter rod 35, and hence the synchronizer rises and moves to the left until it meets the still depressed tappet 35°. There it remains, driving disk 43 at constant speed (relative to disk 41), which speed is the proper one for shifting into "second". Hence he can at any time apply further pressure on the lever and make the shift without noise or shock. In short, it is not necessary for the operator to consciously act in harmony with the synchronizing mechanism; and on the other hand, it is impossible for him to act out of harmony with it. This is a highly advantageous feature, for the action of the synchronizer is so rapid that the desired shift can be made with greatest quickness and with no more or with even less thought than is required in operating the present conventional or standard transmission mechanism; or he can be as slow and deliberate as he pleases.

Figure 5:
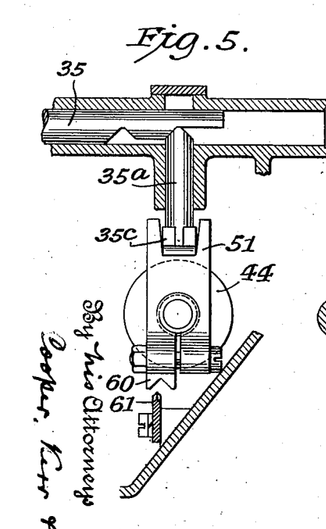

Fig. 5 shows the shifter rod 35 in neutral. Inasmuch as the rear end of the rod is cut away underneath, the plunger or bolt 35ᵃ does not lock the rod in neutral, nor does it lock the rod after it has been shifted (leftwardly) into "high". To lock the rod under these conditions I provide at a point nearer the shift lever (Figs. 2 and 6) a transverse spring-actuated locking plunger 67 to cooperate with notches 68, 69 in the rod 35. When the rod is in neutral it is locked (yieldingly) by the plunger engaging notch 69, as in Fig. 6. When the rod is shifted (rightwardly) into "high", the rod is locked by engagement of the plunger with the notch 68. The plunger also prevents shifting two sets of gears out of neutral at the same time.

As previously stated, when the wheel 44, Fig. 1, tends to rotate the disk 43 faster than permitted by the clutch brake, the effect of the screw connection 62 between the shafts 42 and 27 forces the latter forward for the purpose of easing the brake. At the same time the disk 43 is urged rearwardly against the wheel 44, and if the latter continues to drive the disk ahead of the shaft 27 after the latter has reached its extreme forward position (determined, for example, by the clearance at the point 27ᵃ) the rearward stress on the shaft 42 may be sufficient to break one or both of the disks. To eliminate this possiblity the rear end of the tubular shaft 27 is recessed at 27ᵇ through a suitable angle, say 180°, as in Fig. 9, and the shaft 42 is provided with a stud 27ᶜ between the shoulders 27ᵈ, 27ᵉ of the recess, the stud being so located relative to said shoulders or stops that the stud 27ᶜ and shoulder 27ᵈ will come together and prevent further unscrewing movement of either shaft before an excessive pressure is developed by disk 43 upon the wheel.

Instead of having the forward operative movement of shaft 27, Fig. 1, limited by the clearance at 27ᵃ, between the thrust bearing and the transverse wall of the casing, it is better to have it limited by a latch 72, Fig. 2, pivoted on the front end of the casing 13 and urged by a spring 73 into engagement with the head 74 on rod 55, and cooperating with toe 56 in such manner as to be cammed down out of engagement by the upward movement of the pedal as it is released by the operator. Disengagement does not, however, occur until the pedal has swung upwardly an appreciable distance, which means that a latch of proper length will insure adequate operating pressure between the disks and synchronizing wheel even though the operator partially relaxes his pressure on the pedal.

Figure 3A:
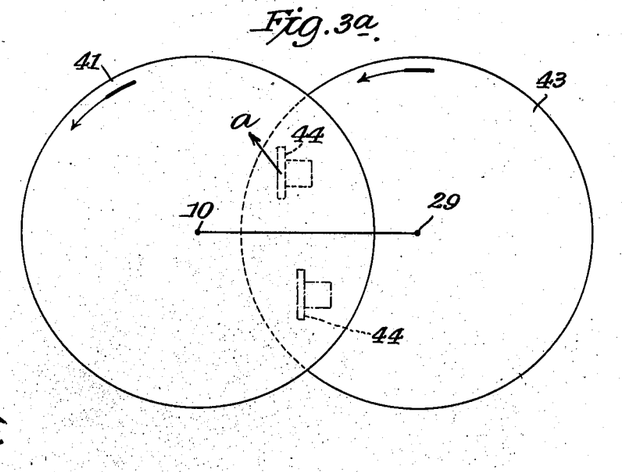
Figure 7:
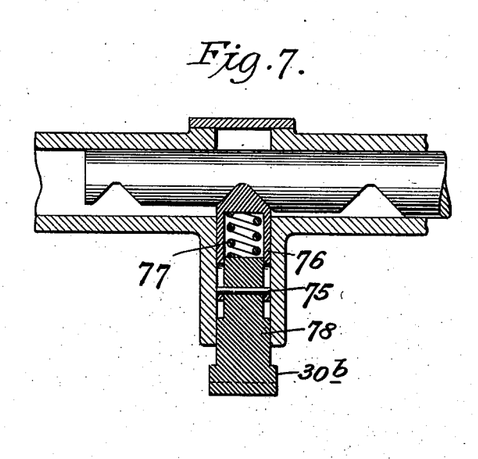
Fig. 7 is a detail sectional view, on a plane corresponding to that of Fig. 4, illustrating a modified form of locking plunger.

If for any reason the synchronizer 44, Fig. 3, should not travel far enough to the right to uncover the tappet 35°, it would be impossible to shift into "intermediate" or into "low" speed, since the downward movement of the synchronizer permitted by the stop 64 is not sufficient for meshing. Accordingly provision may be made for allowing any pair of gears to be meshed regardless of the synchronizer, merely by using extra pressure on the shift lever after the clutch is disengaged. For this purpose both the locking plungers 30ᵃ and 35ᵃ may be constructed as in Fig. 7, in which a plunger is shown consisting of the two telescoping members, one fitted into the other. A removable pin 75 extending into slots in the upper member 76 prevents rotation of the latter and limits its upward movement by the spring 77 which bears on the top of the lower member. The spring is stiff enough to resist compression by the shifter rod (in the present example rod 30) when the force exerted on the shift lever by the operator does not exceed the normal force by more than a predetermined amount. Under such conditions the two members have no relative movement but move up and down as a unit; but if the lower member for any reason cannot be depressed far enough or cannot be depressed at all, additional force on the shift lever will cause the shifter rod notch to cam down the upper member of the plunger and thus permit the gears to be shifted.

It is to be understood that the invention is not limited to the construction herein specifically illustrated and described but can be embodied in other forms without departure from its spirit.

I claim—

1. In a variable-speed power-transmission mechanism, in combination, a pair of gears shiftable into mesh while both are rotating, mechanism for driving one gear from the other at variable speed while the gears are unmeshed, and means controlled by said mechanism for normally preventing meshing of the gears but permitting meshing when the gears have a predetermined pitch-line velocity ratio.

2. In a variable-speed power-transmission mechanism, in combination, a pair of gears, gear-shifting means for producing relative axial movement of the gears to mesh the same, means for driving one gear from the other at variable speed while the gears are unmeshed, and means normally preventing meshing operation of said gear-shifting means but automatically releasing said means for meshing operation when the gears have a predetermined pitch-line velocity ratio.

3. In a variable-speed power-transmission mechanism, in combination, a pair of gears shiftable into mesh while both are rotating, and automatic locking and gear-synchronizing mechanism to prevent shifting of the rotating gears into mesh until they are synchronized.

4. In a variable-speed power-transmitting mechanism, in combination, a pair of gears shiftable into mesh while both are rotating, automatic mechanism operating in harmony with one of the gears to synchronize the other therewith, and means controlled by said mechanism to prevent meshing of the gears until synchronization is effected.

5. In a variable-speed power-transmission mechanism, in combination, a pair of gears shiftable into mesh while both are rotating, automatic locking and gear-synchronizing mechanism to prevent shifting of the rotating gears into mesh until they are synchronized, and means then operable at will to shift the gears into mesh.

6. In a variable-speed power-transmitting mechanism, in combination, a pair of gears shiftable into mesh while both are rotating, automatic mechanism operating in harmony with one of the gears to synchronize the other therewith, means actuated by said mechanism to prevent meshing of the gears until synchronization is effected, and means thereafter operable at will to shift the gears into mesh.

7. In a variable-speed power-transmission mechanism, in combination, a plurality of pairs of gears capable of relative sliding movement in selected pairs to bring them into mesh while the gears of the selected pair are rotating, a plurality of bolts for locking said pairs of gears, a member normally cooperating with said bolts to prevent such sliding movement but shiftable to permit the same, and means acting automatically to shift said member out of cooperation with the bolt of the selected pair whenever the gears of such pair while unmeshed are rotating at a predetermined pitch-line velocity ratio.

8. In a variable-speed power-transmitting mechanism, in combination, a main shaft, a countershaft, gears mounted on said shafts and capable of being meshed by relative axial movement while rotating with the shafts, means for driving one shaft from the other at variable speed to bring the gear on the former to a pitch-line velocity having a predetermined ratio to the velocity of the other gear, and locking means controlled by said driving means for preventing relative axial movement of the gears into mesh until said predetermined ratio is attained.

9. In a variable-speed power-transmission mechanism, in combination, a pair of gears, one of which is shiftable into mesh with the other while both are rotating, a member connected with the shiftable gear to move in harmony therewith, a bolt cooperating with said member to lock the same but shiftable to unlock it, manually controlled automatic mechanism for driving one of the unmeshed gears at a predetermined speed relative to the other, and a detent to prevent shifting of said bolt to unlock said member but actuated by said automatic mechanism to release the bolt when the said predetermined relative speed exists.

10. In a variable-speed power-transmission mechanism, in combination, a pair of gears capable of relative sliding movement while both are rotating to bring them into mesh, a sliding shifter rod connected with one of the gears to slide in harmony therewith and having a cam notch, a spring-actuated bolt cooperating with said notch to oppose sliding of the rod but adapted to be cammed out of the notch as the rod slides, automatic means for driving one of the unmeshed rotating gears at a predetermined speed relative to the other, and a movable detent cooperating with said bolt and shiftable by said automatic means to permit the bolt to be cammed out of said notch when the unmeshed gears are rotating at said predetermined relative speed.

11. In a variable-speed power-transmission mechanism, in combination, a shaft; a gear mounted on the shaft and non-rotatable relatively to the same; a second shaft parallel with the first; a gear mounted on the second shaft and non-rotatable relatively to the same; at least one of said gears being slidable axially into and out of mesh with the other; a rotatable disk associated with the first shaft and having a constant speed-ratio thereto; a rotatable disk overlapping the first disk, and associated with the second shaft with a constant speed-ratio thereto; a shiftable wheel adapted to cooperate with both disks to drive the second shaft from the first at variable speed; and locking mechanism controlled by said wheel, preventing meshing of the gears while the same are rotating at different pitch-line velocities but releasing the slidable gear when the wheel is in position to drive the second shaft from the first at a speed which gives the second gear substantially the same pitch-line velocity as the first gear has.

12. In a variable-speed power-transmission mechanism, in combination, a shaft; a gear mounted on the shaft and non-rotatable relatively to the same; a second shaft parallel with the first; a gear mounted on the second shaft and non-rotatable relatively to the same; at least one of said gears being slidable axially into and out of mesh with the other; a rotatable disk associated with the first shaft and having a constant speed-ratio thereto; a rotatable disk overlapping the first disk, and associated with the second shaft with a constant speed-ratio thereto; a shiftable wheel adapted to cooperate with both disks to drive the second shaft from the first at variable speed; locking mechanism controlled by said wheel, preventing meshing of the gears while the same are rotating at different pitch-line velocities but releasing the slidable gear when the wheel is in position to drive the second shaft from the first at a speed which gives the second gear substantially the same pitch-line velocity as the first gear has; and manual means for shifting the slidable gear into and out of mesh with the other.

13. In a variable-speed power-transmission mechanism, in combination, a shaft adapted to drive a load or be driven by the momentum of the load; a gear mounted on the shaft and non-rotatable relatively to the same; a second shaft parallel with the first; a gear mounted on the second shaft and non-rotatable relatively to the same; at least one of said gears being slidable axially into and out of mesh with the other; a rotatable disk associated with the first shaft and having a constant speed-ratio thereto; a rotatable disk overlapping the first disk, and associated with the second shaft with a constant speed-ratio thereto; a shiftable wheel adapted to cooperate with both disks to drive the second shaft from the first at variable speed; locking mechanism controlled by said wheel, preventing meshing of the gears while the same are rotating at different pitch-line velocities but releasing the slidable gear when the wheel is in position to drive the second shaft from the first at a speed which gives the second gear substantially the same pitch-line velocity as the first gear has.

14. In a variable-speed power-transmission mechanism, in combination, a shaft adapted to drive a load and to be driven by the momentum of the load, at will; a gear mounted on the shaft and non-rotatable relatively to the same; a second shaft parallel with the first; a gear mounted on the second shaft and non-rotatable relatively to the same; at least one of said gears being slidably axially into and out of mesh with the other; means operable at will to connect the second shaft with or disconnect it from a prime-mover; a rotatable disk associated with the first shaft and having a constant speed-ratio thereto; a rotatable disk overlapping the first disk, and associated with the second shaft with a constant speed-ratio thereto; a shiftable wheel adapted to cooperate with both disks to drive the second shaft from the first at variable speed; locking mechanism controlled by said wheel, preventing meshing of the gears while the same are rotating at different pitch-line velocities but releasing the slidable gear when the wheel is in position to drive the second shaft from the former at a speed which gives the second gear substantially the same pitch-line velocity as the first.

15. In a variable-speed power-transmission mechanism, in combination, a shaft; a gear on the shaft and non-rotatable relatively thereto; a second shaft; a gear on the second shaft and non-rotatable relatively thereto; the gears being capable of relative axial movement to mesh and unmesh the same; a disk rotated by the first shaft at constant relative speed; a rotatable disk connected with the second shaft to drive the latter at constant relative speed; a wheel cooperating with both disks and shiftable between the two to drive the second shaft at variable speed from the first; and locking means controlled by the wheel to permit meshing of the gears only when the wheel is in position to drive the second shaft at a predetermined speed relatively to the first.

16. In a variable-speed power-transmission mechanism, in combination, a shaft; a gear on the shaft and non-rotatable relatively thereto; a second shaft; a gear on the second shaft and non-rotatable relatively thereto; the gears being capable of relative axial movement to mesh and unmesh the same; a disk rotated by the first shaft at constant relative speed; a rotatable disk connected with the second shaft to drive the latter at constant relative speed; a wheel cooperating with both disks and shiftable between the two to drive the second shaft at variable speed from the first; locking means controlled by the wheel to permit meshing of the gears only when the wheel is in position to drive the second shaft at a predetermined speed relatively to the first; and manual means for causing said relative axial movement of the gears.

17. In a variable speed power transmission mechanism, in combination, a pair of gears shiftable into mesh while both are rotating, means, including a shiftable detent, to normally lock the gears against shifting into mesh, and automatic mechanism for synchronizing the gears and shifting said detent out of locking position, to permit meshing of the gears when synchronized.

18. In a variable speed power transmission mechanism, in combination, a pair of gears shiftable into mesh while both are rotating, means, including a shiftable detent, to normally lock the gears against shifting into mesh, and automatic mechanism for synchronizing the gears and shifting said detent out of locking position, to permit meshing of the gears when synchronized, said mechanism including a pair of laterally overlapping axially spaced rotating disks operatively associated with the gears, and an axially movable selector wheel between the disks to frictionally engage the same and connected with the detent to shift the latter.

19. In a variable speed power transmission mechanism, in combination, a pair of gears mounted for relative axial movement to mesh the same while rotating, mechanism operable at will to drive one gear from the other while unmeshed, and locking means operated by said means to prevent such axial movement of the gears whenever their tooth velocities are unequal.

20. In a variable speed power transmission mechanism, in combination, a pair of gears adapted to be meshed by relative axial movement, mechanism operable at will to drive one gear from the other while unmeshed to bring their tooth velocities to equality, and automatic means controlled by the gears to lock and unlock the same when their tooth velocities are unequal and equal, respectively.

21. In a variable speed power transmission mechanism, in combination, a pair of gears shiftable into mesh while rotating, and automatic mechanism operating in harmony with one of the gears to synchronize the other therewith, said mechanism including a pair of rotating overlapping disks operatively associated with the gears, and an axially movable selector wheel between said disks for frictional engagement therewith.

In testimony whereof I hereto affix my signature.

FRANK A. HAYES.